United States Patent
Chien et al.

(10) Patent No.: US 6,887,942 B2
(45) Date of Patent: May 3, 2005

(54) LOW SOFTENING TEMPERATURE THERMAL CONDUCTIVE ADHESIVE COMPOSITION

(75) Inventors: Chung-Yi Chien, Taoyuan (TW); Yu-Lung Chen, Taoyuan (TW)

(73) Assignee: Chung Shan Instruments Co., Ltd., Taoyuan (TW)

( * ) Notice: Subject to any disclaimer, the term of this patent is extended or adjusted under 35 U.S.C. 154(b) by 98 days.

(21) Appl. No.: 10/411,242

(22) Filed: Apr. 11, 2003

(65) Prior Publication Data

US 2004/0204527 A1 Oct. 14, 2004

(51) Int. Cl.$^7$ ............... C08L 9/00; C08L 23/00; C08L 33/14; C08L 33/18; C08L 33/20
(52) U.S. Cl. ............... 525/223; 525/232; 525/238; 525/240; 524/401; 524/404; 524/424; 524/441; 524/444; 524/445; 524/450; 524/503; 524/515; 524/521; 524/524
(58) Field of Search ............... 525/223, 232, 525/238, 240; 524/401, 404, 424, 441, 444, 445, 450, 500, 503, 515, 521, 524

(56) References Cited

U.S. PATENT DOCUMENTS 5,898,018 A * 4/1999 Hirano et al. ............... 503/227
6,773,772 B2 * 8/2004 Shinozaki et al. ......... 428/32.6

* cited by examiner

Primary Examiner—Nathan M. Nutter
(74) Attorney, Agent, or Firm—Troxell Law Office PLLC

(57) ABSTRACT

A low softening temperature thermal conductive adhesive composition is made from a blend of liquid NBR in molecular weight of 300~100,000 and ethylene vinyl acetate (EVA) to have a softening point of 38~65° C. With proper addition of sub-micron or nano powder thermal conductive agents like aluminum oxide, zinc oxide, aluminum nitride, boron nitride, graphite, metal powder or nano clay, the adhesive can be made into a membrane with thickness of 0.01~5 mm and thermal conductivity of 0.5~5 W/m-K, and thermal conductive plate with thermal resistance of 0.005~0.2° C.in$^2$/W. The thermal conductive plate has softening point of 38~65° C., preferably 45° C. to avoid liquidation during storage and transportation. Further application includes use as the sealant or thermal conductive interface in electronic components and heat dissipaters to reduce heat resistance and improve thermal conductive efficiency.

9 Claims, 1 Drawing Sheet

LOW SOFTENING TEMPERATURE THERMAL CONDUCTIVE ADHESIVE COMPOSITION

FIELD OF THE INVENTION

The present invention is to provide a low softening temperature thermal conductive adhesive composition, which can be used as sealant or thermal conductive interface in electronic components and heat dissipaters to reduce heat resistance to improve thermal conductive efficiency.

BACKGROUND OF THE INVENTION

Traditionally, the thermal conductive materials used in heat generating electronic components to help dissipate heat can be divided into the following types:

The first type is a thermal conductive ceramic material, which uses ceramic thin plate as thermal conductive pad. It is mainly mica and graphite. When in use, both sides of the thermal conductive plate should be applied with thermal conductive paste to reduce interface resistance. But the disadvantage is that it is easy to break and hard to cut.

The second type is a thermal conductive pad, which uses thermal conductive polymer to apply on glass fiber fabric. The advantages for glass fiber fabric are high tensile strength and flexibility, cuttability and toughness. The disadvantages are thickness over 0.05 mm and unlikely below 0.1 mm with coated polymer. Thus, its thermal resistance is high and finds application in low heat generating components.

The third type is a thermal conductive paste, which is in a form of liquid or semi-solid thermal conductive paste that is formed of a liquid polymer and added ceramic powder, graphite or metal powder. This type of material has advantages of low thermal resistance and good thermal conductivity, but disadvantages of easy contaminating electronic components or circuit board, and besides, possibility of drying up and small molecule volatiles at high temperature.

The fourth type is a low melting point metal thermal conductive plate, which is a thermal conductive material made by applying alloy with melting point below 100° C. to both sides of metal foil. Because low melting point alloy has much less strength and ductility than normal metals, it can only be shaped when it is coated on metal foil. Such a material has disadvantages that alloy adherence diminishes when it melts, alloy leaks out under compression. As a result, performance will deteriorate. Furthermore, it does not provide stable quality and repeatable use.

Therefore, to overcome the above disadvantages, the industry has an invention of low softening temperature thermal conductive adhesive material. For example, the technology can be found in U.S. Pat. No. 5,950,066 and U.S. Pat. No. 6,197,859. The two patents disclosed the method to synthesize low softening temperature adhesive with C16 to C19 alkenes and C30 to C45 silanes and silicones with at least one hydrogen atom attached to one silicon atom. Then, a softening agent like vinyl acetate resin in 15~20 weight units is added to increase flexibility. Thus, a low temperature thermal conductive material is made. However, because this process needs to use softening agent in the formulation, it takes longer time for the additional step. Besides, due to large difference in solubility parameter between different materials, phase separation occurs. Practically, the method disclosed in the patents is not a suitable process.

SUMMARY OF THE INVENTION

The main purpose of the invention is to provide a low softening temperature thermal conductive adhesive composition that is made from a blend of liquid NBR in molecular weight of 300~100,000 and ethylene vinyl acetate (EVA) to have a softening point of 38~65° C. With proper addition of sub-micron or nano powder thermal conductive agents like aluminum oxide ($Al_2O_3$), zinc oxide (ZnO), aluminum nitride (AlN), boron nitride (BN), graphite (C), copper (Cu), aluminum (Al), silver (Ag) or nano clay, the adhesive can be made into a material with good thermal conductivity and low thermal resistance, which is suitable for use as the sealant or thermal conductive interface in electronic components and heat dissipaters to reduce heat resistance and improve thermal conductive efficiency.

Another objective of the present invention is to provide a low softening temperature thermal conductive adhesive composition that is a thermal conductive material with softening temperature at 38~65° C. and can be softened to posses enhanced sealant property by heat generating electronic components to reduce the thermal resistance between heat generating electronic components and heat dissipaters.

DETAILED DESCRIPTION OF THE INVENTION

Figure 1:
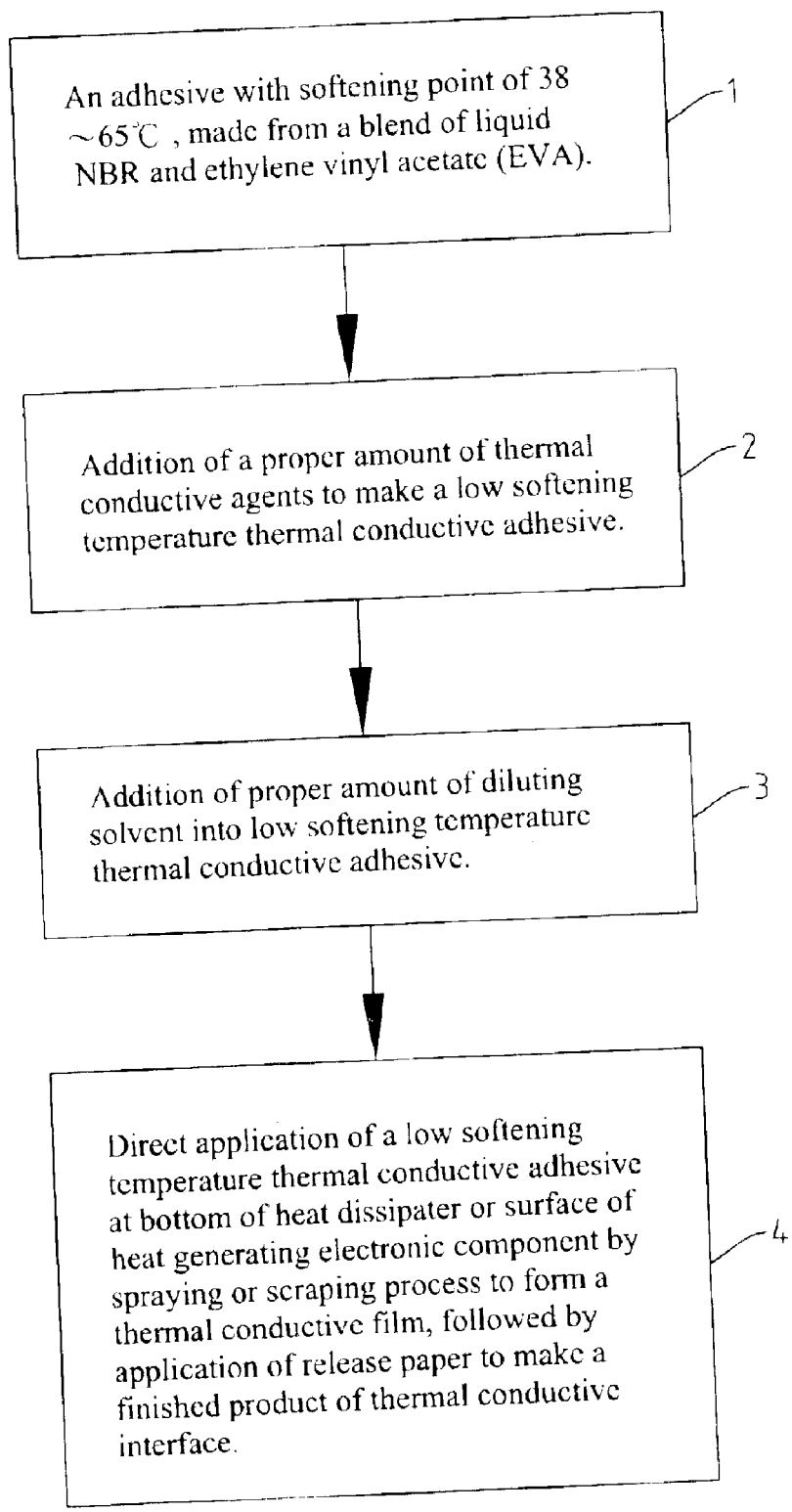
FIG. 1 is an illustration for the process to manufacture the low softening temperature thermal conductive adhesive in the present invention into a thermal conductive interface.

The low softening temperature thermal conductive adhesive composition in the present invention is made from a blend of liquid NBR in molecular weight of 300~100,000 and ethylene vinyl acetate (EVA) with a proper amount of thermal conductive agents to have a softening point of 38~65° C.

The said liquid NBR has molecular formula: $CH_3(-CH=CH-CH-CN-)_n CH=CH_2$, n=13–16.

The said thermal conductive agents can be sub-micron or nano powder thermal conductive agents made of aluminum oxide ($Al_2O_3$), zinc oxide (ZnO), aluminum nitride (AlN), boron nitride (BN), graphite (C), copper (Cu), aluminum (Al), silver (Ag) or nano clay.

In this way, the formula is used to give a low softening temperature thermal conductive adhesive with melting point of 38~65° C. After melting, the material has a viscosity between $1\times10^2 \sim 1\times10^5$ cps. The sub-micron or nano powder thermal conductive agent can be coated to give a film thickness of 0.01~5 mm and thermal conductivity of 0.5~5 W/m-K and thermal resistance of 0.005~0.2° C.in$^2$/W.

The procedures in the present invention to manufacture the low softening temperature adhesive material into a thermal conductive interface are described as follows: (as in FIG. 1).

Step (1): firstly, put 100 weight units of liquid NBR and 5~50 weight units of EVA into a mixing tank under heating at 100° C. Mix the materials to obtain a uniform mixture.

Step (2): Add 50~500 weight units of thermal conductive agents into the above mixture. After 30 minutes of mixing, the mixture is made into a low softening temperature thermal conductive adhesive material.

Step (3): Add 20 grams of the low softening temperature thermal conductive material into 80 ml of diluting solvent. Heat and stir the mixture for over 30 minutes to obtain a solution viscosity of 800–1000 cps, which is then suitable for spraying or scraping application.

The said diluting solvent can be acetone, butyl acetate, toluene or MIBK or mixtures of the above. The mixture has a solution viscosity of 800~1000 cps.

Step (4): In use, directly apply the material by spraying or scraping onto the bottom of heat dissipaters or the surface of heat generating electronic components to give a thickness of 0.01~0.1 mm. After the solvent evaporates, a low softening temperature thermal conductive thin film is formed. The material can also be sprayed onto one side of release paper. After the solvent evaporates, another layer of release paper is put to form a thermal conductive film.

The application method for thermal conductive film is first to remove one release paper, and then place the side with low softening thermal conductive material to the bottom of the heat dissipaters or the surface of heat generating electronic components. This is a way to use thermal conductive adhesive between heat generating electronic components and heat dissipaters with the low softening thermal conductive material as a thermal conductive interface to increase heat dissipation efficiency.

The following will give a further description with examples for manufacturing the low softening temperature thermal conductive adhesive material into a thermal conductive interface.

Embodiment 1:
(1) Put 100 weight units of liquid NBR and 10 weight units of EVA into a mixing tank under heating at 100° C. Mix the materials thoroughly to obtain a uniform mixture.
(2) Add 300 weight units of $Al_2O_3$ and 50 weight units of ZnO thermal conductive agents into the premixed adhesive material. Heat the mixture to 100° C. and keep mixing for at least 30 minutes. Then, a low softening temperature thermal conductive adhesive material will be obtained.
(3) After the a low softening temperature thermal conductive adhesive material is heated and softened to become a paste, a coater is used to apply the paste onto a surface-roughened aluminum alloy heat dissipater with thickness of 0.01~0.1 mm.
(4) After cooling, apply a release paper to the low softening temperature thermal conductive adhesive film to avoid sticky surface. The finished product for use as a thermal conductive interface is obtained.

From the testing of applying this low softening temperature thermal conductive adhesive film as a thermal conductive interface on heat generating electronic components, it is found that the thermal resistance is 0.12° $C.in^2/W$. It is evident that the present invention can produce a low softening temperature thermal conductive adhesive material with very low thermal resistance and good sealant property. The practical testing was conducted on the material for use as the thermal conductive sealant material for a desktop computer with a central processing unit at operation frequency of 2.4 GHz and power below 60 W.

Embodiment 2:
(1) Put 100 weight units of liquid NBR and 10 weight units of EVA into a mixing tank under heating at 100° C. Mix the materials thoroughly to obtain a uniform mixture.
(2) Add 150 weight units of AlN and 50 weight units of ZnO thermal conductive agents into the premixed adhesive material. Heat the mixture to 100° C. and keep mixing for at least 30 minutes. Then, a low softening temperature thermal conductive adhesive material will be obtained.
(3) After the low softening temperature thermal conductive adhesive material is heated and softened to become a paste. Directly add 200 weight units of butyl acetate and 50 weight units of toluene. Mix thoroughly for over 30 minutes to obtain a uniform mixture. A spraying coater is used to apply the material mixture onto a surface-roughened aluminum alloy heat dissipater with thickness of 0.01~0.1 mm.
(4) After cooling, apply a release paper to the low softening temperature thermal conductive adhesive film to avoid sticky surface. The finished product for use as a thermal conductive interface is obtained.

From the testing of applying this low softening temperature thermal conductive adhesive as a thermal conductive interface on heat generating electronic components, it is found that the thermal resistance is 0.11° $C.in^2/W$ and melting point is 57° C. Therefore, it is evident that the present invention can produce a low softening temperature thermal conductive adhesive material with very low thermal resistance and good sealant property. The practical testing was conducted on the material for use as the thermal conductive sealant material for a desktop computer with a central processing unit at operation frequency of 2.2 GHz and power below 60 W.

Embodiment 3:
Step (1)~(2) are the same as step (1)~(2) in embodiment 2.
(3) After the low softening temperature thermal conductive adhesive material is heated and softened to become a paste. Add directly 200 weight units of butyl acetate and 50 weight units of toluene. Agitate the mixture for at least 30 minutes. Apply the material uniformly by scraping method to one side a release paper. Dry the material to flash off the solvent.

The release paper material can be normal paper, polyethylene, polypropylene, polyvinyl chloride and polyimide etc. The layer thickness should be controlled at 0.01~0.1 mm.
(4) After cooling, apply a release paper to the low softening temperature thermal conductive adhesive film to avoid sticky surface. The finished product for use as a low softening temperature thermal conductive film is obtained.

From the testing of applying this low softening temperature thermal conductive adhesive as a thermal conductive interface between heat generating electronic components and hest dissipaters, it is found that the thermal resistance is 0.11° $C.in^2/W$ and melting point is 57° C. Therefore, it is evident that the present invention can produce a low softening temperature thermal conductive adhesive material with very low thermal resistance and good sealant property. The practical testing was conducted on the material for use as the thermal conductive sealant material for a desktop computer with a central processing unit at operation frequency of 2.2 GHz and power below 60 W.

In addition, the thermal conductive interface made from the low softening temperature thermal conductive adhesive material can further incorporate a suitable amount of paraffin to improve the softening temperature for the thermal conductive interface.

What is claimed is:
1. A low softening temperature thermal conductive adhesive composition, made from a blend of liquid NBR in a viscosity average molecular weight of 300~100,000 and ethylene vinyl acetate (EVA) with a proper amount of thermal conductive agent to have a softening point of 38~45° Celsius.

2. The low softening temperature thermal conductive adhesive composition of claim 1, wherein said liquid NBR has a molecular formula that is $CH_3(-CH=CH-CH-CN-)_nCH=CH_2$, n=13~50.

3. The low softening temperature thermal conductive adhesive composition of claim 1, wherein said thermal conductive agent can be sub-micron or nano powder thermal conductive agents made of aluminum oxide ($Al_2O_3$), zinc oxide (ZnO), aluminum nitride (AlN), boron nitride (BN), graphite (C), copper (Cu), aluminum (Al), silver (Ag) metal powder or nano clay.

4. The low softening temperature thermal conductive adhesive composition of claim 1, wherein after heating and softening, the low softening temperature thermal conductive adhesive material can be directly applied by spraying or scraping method to a heat generating electronic components or heat dissipaters as a thermal conductive interface with thickness controlled at 0.01~0.1 mm.

5. The low softening temperature thermal conductive adhesive composition of claim 1, wherein low softening temperature thermal conductive adhesive material can incorporate a suitable amount of diluting solvent to facilitate spraying or scarping application.

6. The low softening temperature thermal conductive adhesive composition of claim 5, wherein said diluting solvent can be acetone, butyl acetate, toluene, MIBK or mixtures of above to make a solution viscosity of 800~1000 cps.

7. The low softening temperature thermal conductive adhesive composition of claim 1, wherein after adding diluting solvent into said material, said low softening temperature thermal conductive adhesive composition can be directly applied by scraping method to one side of a release paper, and said release paper is subject to drying to remove said solvent, after cooling, another release paper is put on to produce a low softening temperature thermal conductive product.

8. The low softening temperature thermal conductive adhesive composition of claim 5, wherein said release paper material can be normal papers, polyethylene, polypropylene, polyvinyl chloride and polyimide etc.

9. The low softening temperature thermal conductive adhesive composition of claim 1, wherein said thermal conductive material can further incorporate paraffin to improve softening temperature for said thermal conductive interface.

* * * * *